Oct. 10, 1933.  D. E. PRIEST  1,929,989
COPING SAW
Filed Oct. 26, 1932
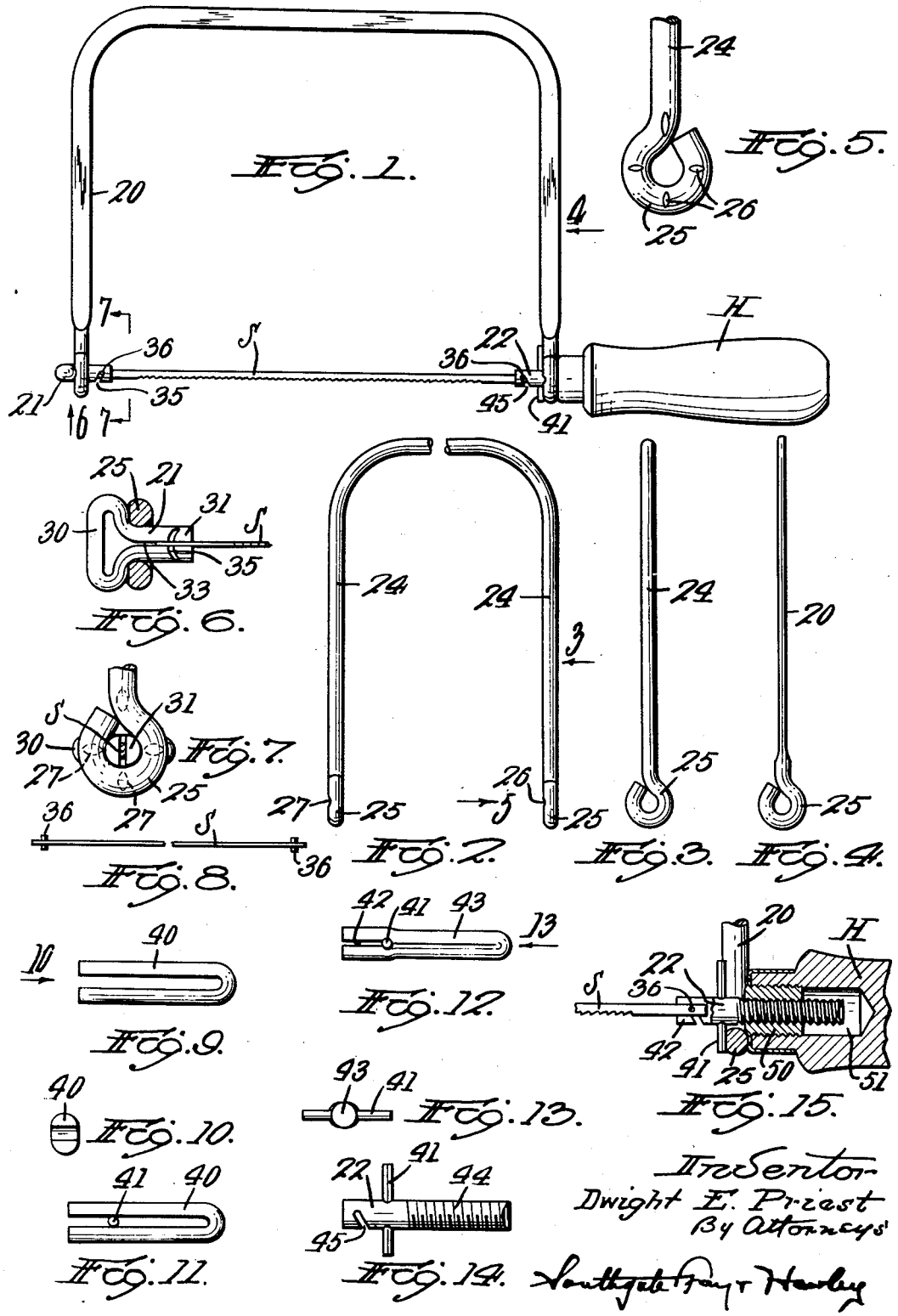
Inventor
Dwight E. Priest
By Attorneys Patented Oct. 10, 1933

1,929,989

UNITED STATES PATENT OFFICE 1,929,989

COPING SAW

Dwight E. Priest, Worcester, Mass., assignor to Parker Wire Goods Company, Worcester, Mass., a corporation of Massachusetts Application October 26, 1932. Serial No. 639,661

5 Claims. (Cl. 145—33)

This invention relates to a coping or jig saw of the type in which a light thin saw blade is removably mounted in a supporting and tensioning frame.

It is the general object of my invention to improve the construction of such saws to the end that they may be economical in manufacture, reliable in operation and satisfactory in use.

To the accomplishment of this general object, important features of my invention relate to the provision of an improved frame member for the saw, and to the provision of improved devices for securing and tensioning a saw blade therein.

My invention further relates to arrangements and combinations of parts which will be hereinafter described and more particularly pointed out in the appended claims.

A preferred form of the invention is shown in the drawing, in which

Fig. 1 is a side elevation of my improved saw;

Fig. 2 is a side elevation showing a preliminary step in the manufacture of the frame member;

Fig. 3 is an end view of the frame member, looking in the direction of the arrow 3 in Fig. 2;

Fig. 4 is an end view of the finished frame member, looking in the direction of the arrow 4 in Fig. 1;

Fig. 5 is an enlarged detail elevation, looking in the direction of the arrow 5 in Fig. 2;

Fig. 6 is an enlarged view of the saw securing member, looking in the direction of the arrow 6 in Fig. 1;

Fig. 7 is an enlarged view, taken along the line 7—7 in Fig. 1;

Fig. 8 is a plan view of a saw blade;

Fig. 9 is a side view of the tensioning member at a preliminary stage;

Fig. 10 is an end view, looking in the direction of the arrow 10 in Fig. 9;

Figs. 11 and 12 are side elevations showing further successive steps in the production of the tensioning member;

Fig. 13 is an end view, looking in the direction of the arrow 13 in Fig. 12;

Fig. 14 is a plan view of the completed tensioning member, and

Fig. 15 is a detail sectional side elevation showing the construction of the saw handle.

Referring to the drawing, I have shown a coping or jig saw comprising a frame member 20, a saw S, a securing member 21, a tensioning member 22 and a handle H. The frame member 20 is preferably formed from a single piece of wire rod 24 of circular cross section, which is first bent to a general U-shape as indicated in Fig. 2.

The ends of the wire rod 24 are bent to the circular shape indicated at 25 in Fig. 3 and provide eyes or bearings for the securing member 21 and tensioning member 22. Notches 26 (Figs. 2 and 5) and 27 (Figs. 2 and 7) are provided for a purpose to be described in the left-hand face of each curved end or bearing portion 25 as viewed in Fig. 1.

The frame member thus constructed is then subjected to a press or hammer operation by which the round rod 24 is flattened to the shape indicated in the frame 20 in Figs. 1 and 4. The subjection of the frame to this pressing or flattening operation after being bent to the U-shape form shown in Fig. 2 substantially increases the stiffness of the frame over that of the round rod from which it is constructed.

The securing member 21 (Figs. 6 and 7) is preferably formed from a single piece of half round rod bent to provide a head or end portion 30 and a body portion 31. The two parts of the body portion 31 are spaced apart to provide a slot 33 adapted to receive an end portion of the saw S. The parts 31 are also provided with angularly disposed transverse slots 35 (Figs. 1 and 6) adapted to receive a cross pin 36 in one end of the saw S. The slots 35 may be formed in any convenient manner, as by a milling or punching operation.

The inner face of the head portion 30 is engaged in certain of the notches 27 when the parts are assembled and is thus held firmly from accidental angular displacement.

The tensioning member 22 is also preferably formed from a single piece of half round rod, which is first bent to the narrow U-shape indicated at 40 in Figs. 9 and 10. A cross pin 41 is then placed between the spaced portions of the securing member 40, as indicated in Fig. 11, and the assembled parts 40 and 41 are subjected to a press operation by which the cross pin 41 is firmly gripped between the two side portions of the tensioning device and by which also a slot 42 is provided to receive an end portion of the saw S.

The portion of the U-shaped member at the opposite side of the cross pin 41 is pressed to substantially circular cross section, as indicated at 43 in Figs. 12 and 13, and this portion is thereafter suitably threaded as indicated at 44 in Fig. 14. The securing device 22 is also provided with inclined transverse slots 45, similar to the slots 35 previously described and adapted to receive a second cross pin 36 in the saw S. When the parts are assembled, the cross pin 41 is seated in certain of the notches 26 in the frame member 20, as indicated in Fig. 15.

The handle H has a nut 50 firmly seated in a recess 51, and by turning the handle the tensioning device 22 is drawn through the eye or bearing in one end of the frame 20, thus tensioning the saw S and firmly seating both the securing device 21 and the tensioning device 22.

By loosening the handle H, the devices 21 and 22 may be turned to present the edge of the saw in any one of four different directions, and in each direction the saw will be firmly held from angular displacement.

Having thus described my improved coping saw, it will be evident that the several parts of the saw may each be very rapidly and economically manufactured, and that each part is particularly well adapted to its intended purpose.

Having thus described my invention and the advantages thereof, I do not wish to be limited to the details herein disclosed, otherwise than as set forth in the claims, but what I claim is:—

1. In a coping saw, an integral one-piece frame member having end portions of round wire rod bent into loops to form bearings, and having a U-shaped connecting portion which is substantially thinner and wider than said circular wire rod and which has flat side surfaces disposed parallel to the plane of said frame member, whereby said frame member is substantially stiffened without increase in material.

2. In a coping saw, a securing device formed from a single piece of half round stock bent upon itself to provide a transversely extended head and parallel legs spaced apart to provide a longitudinal slot for one end of a saw blade, said parallel legs being transversely slotted to receive a cross pin in said saw blade.

3. In a coping saw, a tensioning device formed from a single piece of half round stock and a cross pin, said stock being bent upon itself to provide parallel leg portions and said leg portions being compressed about said cross pin and being spaced apart at one side of said pin and at the open end of said device to provide a longitudinal slot for one end of a saw blade.

4. In a coping saw, a tensioning device formed from a single piece of half round stock and a cross pin, said stock being bent upon itself to provide parallel leg portions and said leg portions being compressed about said cross pin and being spaced apart at one side of said pin and at the open end of said device to provide a longitudinal slot for one end of a saw blade, and said spaced-apart leg portions being transversely slotted to receive a cross pin in said saw blade.

5. In a coping saw, a tensioning device formed from a single piece of half round stock and a cross pin, said stock being bent upon itself to provide parallel leg portions and said leg portions being compressed about said cross pin and being spaced apart at one side of said pin and at the open end of said device to provide a longitudinal slot for one end of a saw blade, said tensioning device being also screw-threaded at the opposite side of said cross pin and at the closed end of said device.

DWIGHT E. PRIEST.